US009227669B2

(12) United States Patent
Shigihara (10) Patent No.: US 9,227,669 B2
(45) Date of Patent: Jan. 5, 2016

(54) STRUCTURE OF FLOOR PANEL OF VEHICLE BODY

(71) Applicant: Toyota Jidosha Kabushiki Kaisha, Toyota-shi Aichi-ken (JP)

(72) Inventor: Takayoshi Shigihara, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 14/484,307

(22) Filed: Sep. 12, 2014

(65) Prior Publication Data

US 2015/0084376 A1    Mar. 26, 2015

(30) Foreign Application Priority Data

Sep. 20, 2013 (JP) .................................. 2013-195497

(51) Int. Cl.
*B62D 25/08* (2006.01)
*B62D 43/10* (2006.01)

(52) U.S. Cl.
CPC .............. *B62D 25/087* (2013.01); *B62D 43/10* (2013.01)

(58) Field of Classification Search
CPC .. B62D 25/087; B62D 25/20; B62D 25/2009; B62D 25/2027; B62D 25/2036; B62D 43/00; B62D 43/06; B62D 43/08; B62D 43/10
USPC ......... 296/37.2, 203.04, 193.07, 193.08, 204, 296/187.11, 187.08
See application file for complete search history.

(56) References Cited

U.S. PATENT DOCUMENTS

| 6,053,566 | A  | * | 4/2000  | Aghssa et al.    | 296/187.11 |
|-----------|----|---|---------|------------------|------------|
| 6,830,287 | B1 | * | 12/2004 | Aghssa et al.    | 296/187.11 |
| 7,036,860 | B1 | * | 5/2006  | McGuckin et al.  | 296/37.2   |
| 7,090,290 | B2 | * | 8/2006  | Neumeier et al.  | 296/204    |
| 7,338,115 | B2 | * | 3/2008  | Rocheblave et al.| 296/193.07 |
| 7,380,856 | B2 | * | 6/2008  | Kobayashi et al. | 296/37.2   |
| 7,540,559 | B2 | * | 6/2009  | Egawa et al.     | 296/203.04 |
| 8,091,941 | B2 | * | 1/2012  | Asou et al.      | 296/37.2   |
| 8,651,549 | B2 | * | 2/2014  | Raffel et al.    | 296/37.2   |
| 2011/0156431 | A1 |  | 6/2011  | Souma et al.     |            |
| 2011/0227367 | A1 | * | 9/2011  | Funakoshi        | 296/187.11 |

FOREIGN PATENT DOCUMENTS

| JP | H03-125682   | U  | 12/1991 |
|----|--------------|----|---------|
| JP | H08-142916   | A  | 6/1996  |
| JP | 10-297543    | A  | 11/1998 |
| JP | 2000-291443  | A  | 10/2000 |
| JP | 2011-131712  | A  | 7/2011  |
| JP | 2013-023001  | A  | 2/2013  |
| JP | 2013-086757  | A  | 5/2013  |
| WO | 2013057892   | A1 | 4/2013  |

* cited by examiner

*Primary Examiner* — Gregory Blankenship
(74) *Attorney, Agent, or Firm* — Dinsmore & Shohl LLP (57) ABSTRACT

Disclosed is a structure of a floor panel which includes a rear floor panel that is provided in a vehicle body, and has a storage portion for a spare tire; a rear crossmember that is installed on a front side of the rear floor panel so as to extend in a lateral direction of the vehicle body, and is joined to the rear floor panel; a rear end panel that is installed on a rear side of the rear floor panel 10 so as to extend in the lateral direction of the vehicle body, and is joined to the rear floor panel 10; and a bead portion that is formed in the rear floor panel while having a lengthwise direction of the vehicle body as a longitudinal direction of the bead portion, and extends to an installation region of the rear crossmember.

7 Claims, 11 Drawing Sheets

STRUCTURE OF FLOOR PANEL OF VEHICLE BODY

BACKGROUND OF THE INVENTION

1. Field of the Invention

The present invention relates to the structure of a floor panel of a vehicle body.

2. Related Background Art

In the related art, for example, Pamphlet of International Publication No. WO2013/057892 discloses the structure of a floor panel of a vehicle body in which longitudinally opposite ends and laterally opposite ends of a rear floor panel are inclined toward the center of the rear floor panel. With this structure, it is possible to improve the rigidity of the rear floor panel, and control the vibration characteristics thereof.

Japanese Unexamined Patent Application Publication No. 10-297543 and Japanese Unexamined Patent Application No. 2000-291443 are examples of the related art.

However, in the structure of the floor panel, it is necessary to change the size of the rear floor panel depending on the respective inclined angles of the opposite ends of the rear floor panel, and thus there may be some restrictions in the design of the vehicle body.

An object of the present invention is to provide a structure of a floor panel of a vehicle body in which it is possible to improve the rigidity of the floor panel and control vibration characteristics of the floor panel while reducing restrictions in the design of the vehicle body.

The structure of the floor panel according to an aspect of the present invention includes a rear floor panel that is provided in a vehicle body, and has a storage portion for a spare tire; a first framework member that is installed on a front side of the rear floor panel so as to extend in a lateral direction of the vehicle body, and is joined to the rear floor panel; a second framework member that is installed on a rear side of the rear floor panel so as to extend in the lateral direction of the vehicle body, and is joined to the rear floor panel; and a concave portion that is formed in the rear floor panel in a longitudinal direction toward a lengthwise direction of the vehicle body, and extends to an installation region of the first framework member.

In this configuration, the concave portion is formed in the rear floor panel in the longitudinal direction toward a lengthwise direction of the vehicle body. The concave portion extends to the installation region of the first framework member. Accordingly, since the concave portion with high rigidity functions as a framework portion of the rear floor panel, and the first framework member supports the rear floor panel with the front side of the rear floor panel proximate to a fixing end, it is possible to improve the rigidity of the entirety of the rear floor panel. The rear floor panel is deemed to have a beam structure in which one end of the rear floor panel is fixed and the other end is pin-supported, and it is possible to control the vibration characteristics of the rear floor panel. Accordingly, it is possible to improve the rigidity of the rear floor panel and control the vibration characteristics of the rear floor panel while reducing restrictions in the design of the vehicle body.

In this aspect of the present invention, it is possible to provide the structure of the floor panel of the vehicle body in which it is possible to improve the rigidity of the floor panel and control the vibration characteristics of the floor panel while reducing restrictions in the design of the vehicle body.

DESCRIPTION OF THE PREFERRED EMBODIMENTS

Hereinafter, the structure of a floor panel of a vehicle body according to an embodiment of the present invention will be described in detail with reference to the accompanying drawings. In the description of the drawings, the same reference signs will be assigned to the same elements, and the descriptions thereof will be omitted.

The structure of the floor panel of the vehicle body according to the embodiment of the present invention will be described with reference to FIGS. 1 to 5. Hereinafter, the structure of a (rear) floor panel provided in a rear portion of the vehicle body will be described as an example of the structure of the floor panel according to the embodiment of the present invention. Longitudinal (Fr, Rr), vertical (Up, D), and lateral (L, R) directions in the structure of the floor panel coincide with lengthwise, vertical, and lateral directions of the vehicle body, respectively.

Figure 1:
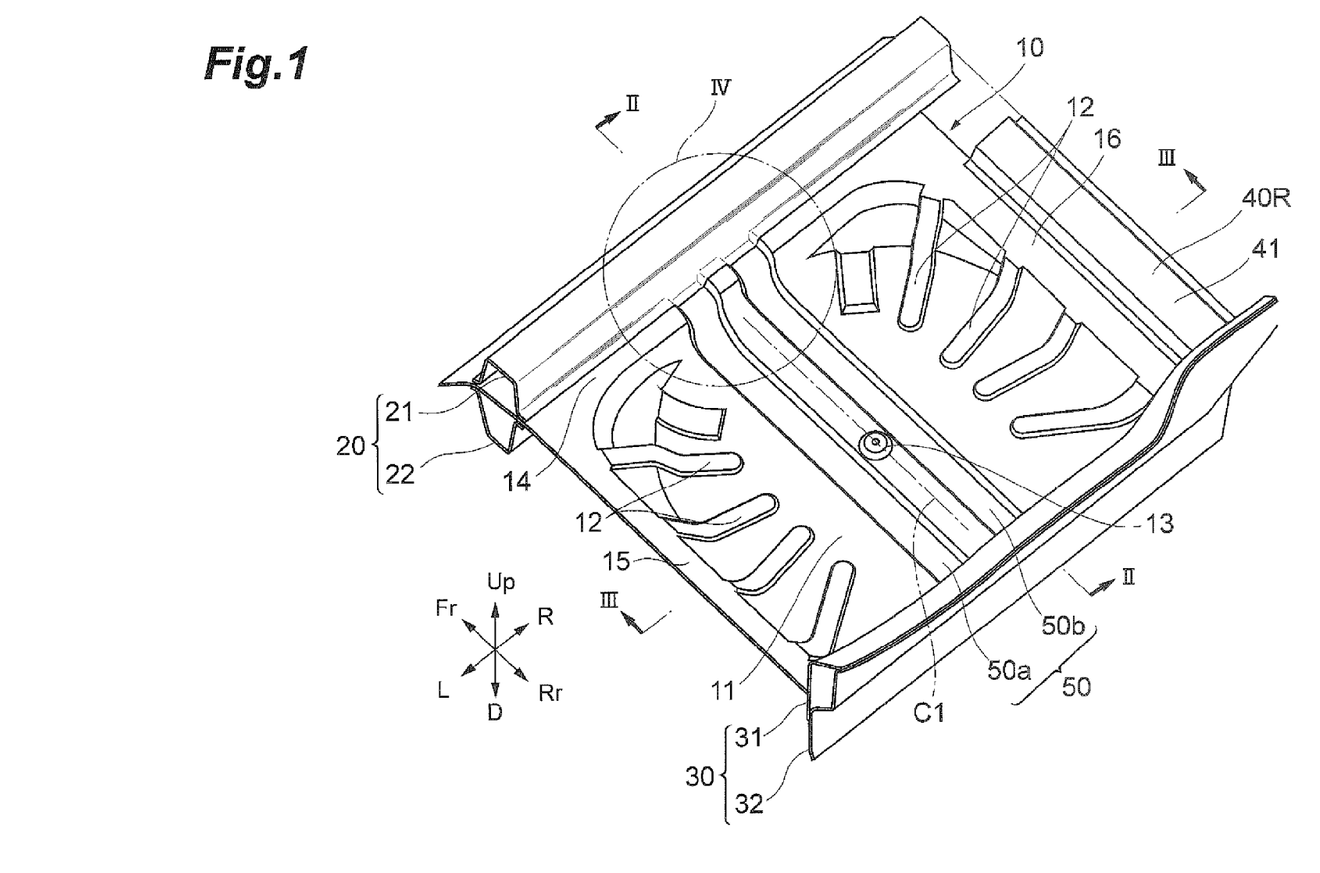
FIG. 1 is a perspective view illustrating the structure of a floor panel according to an embodiment of the present invention.
Figure 2:
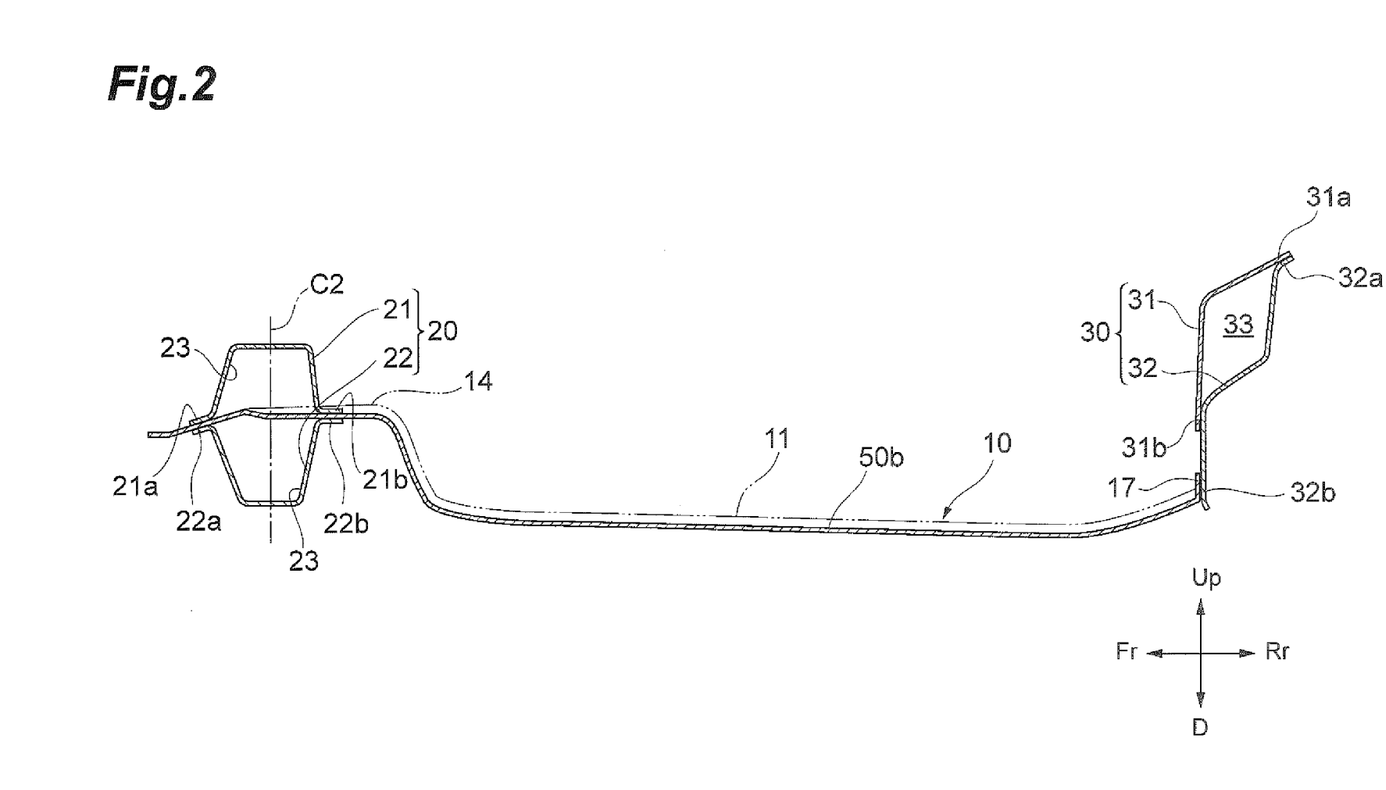
FIG. 2 is a cross-sectional view illustrating the structure of the floor panel taken along line II-II illustrated in FIG. 1.
Figure 3:
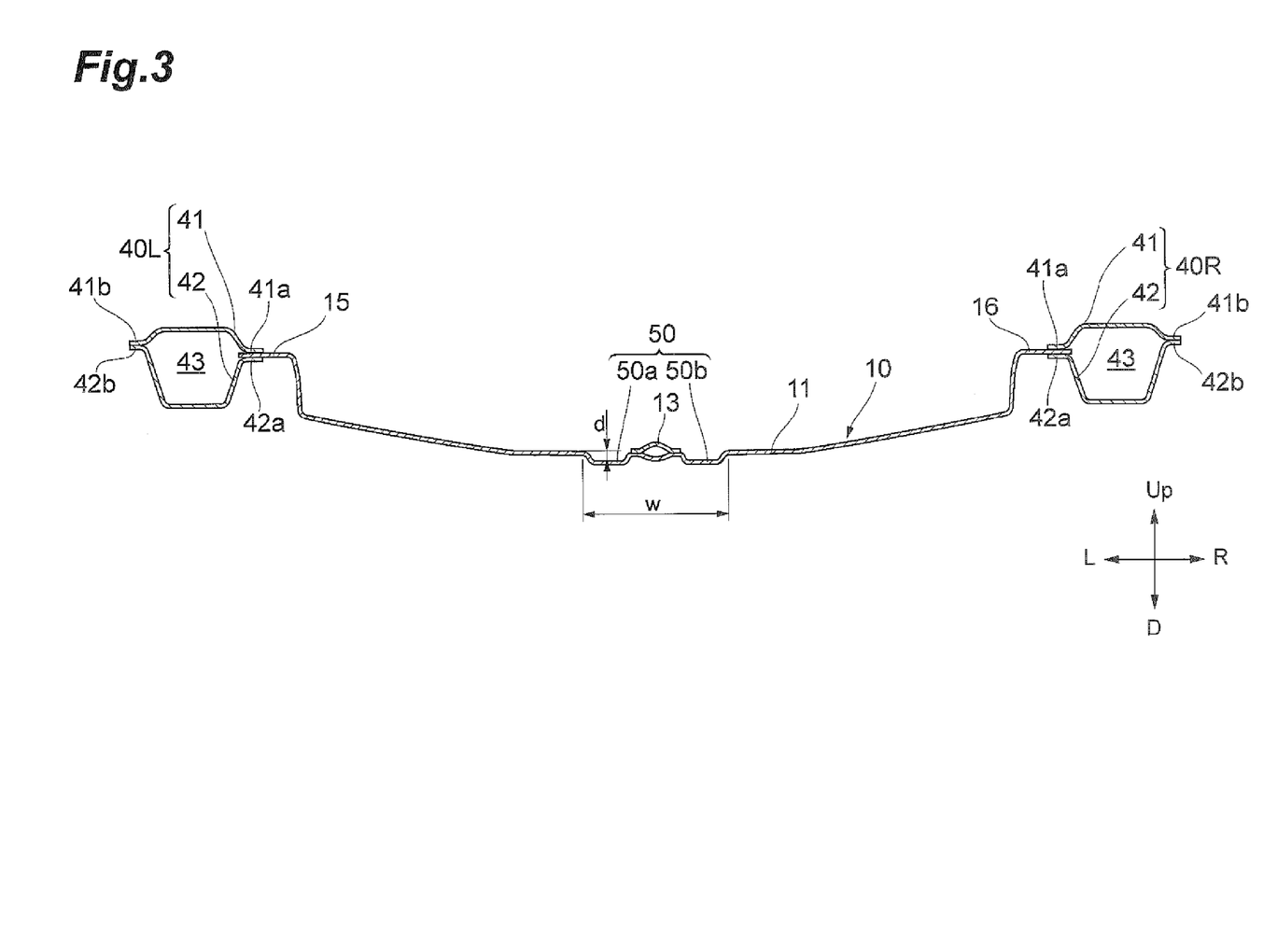
FIG. 3 is a cross-sectional view illustrating the structure of the floor panel taken along line III-III illustrated in FIG. 1.
Figure 4:
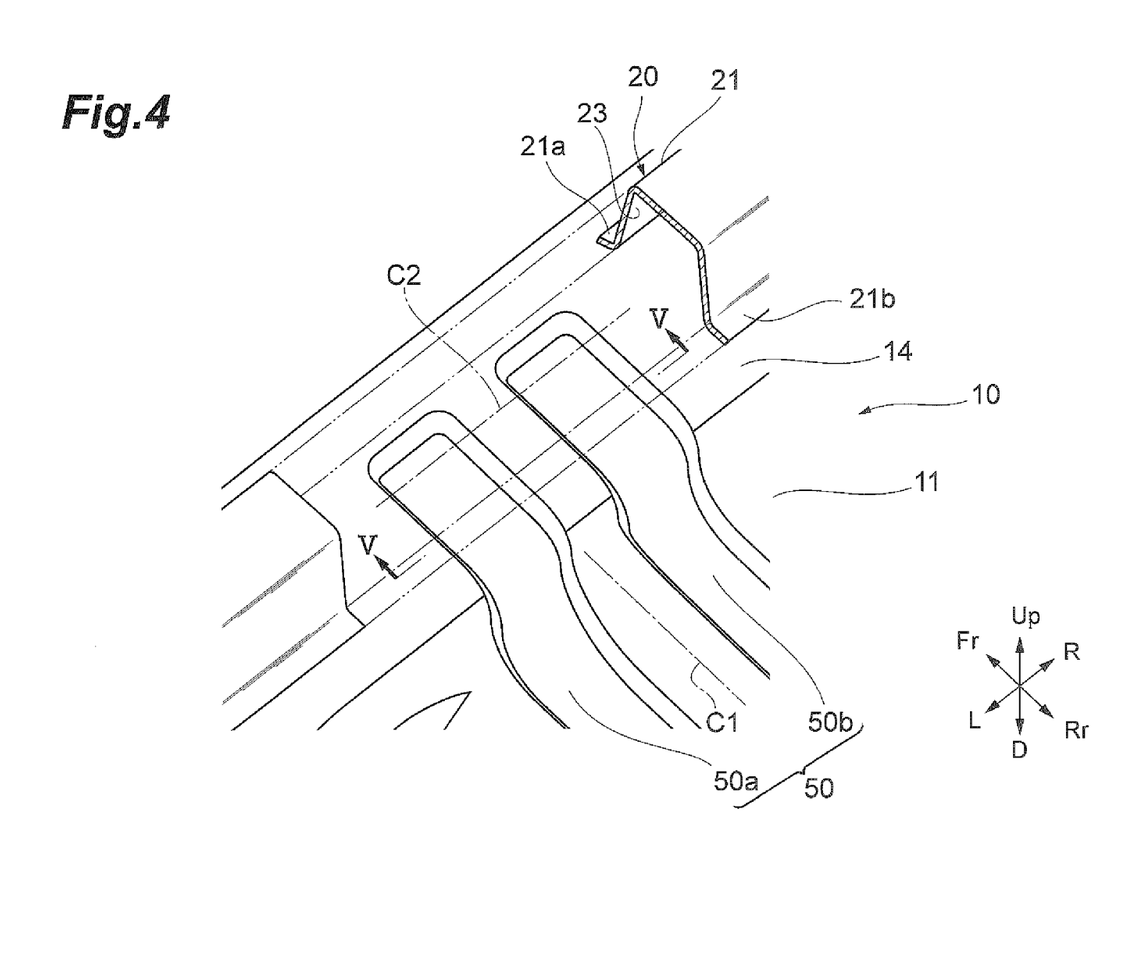
FIG. 4 is an enlarged perspective view of region IV illustrated in FIG. 1.
Figure 5:
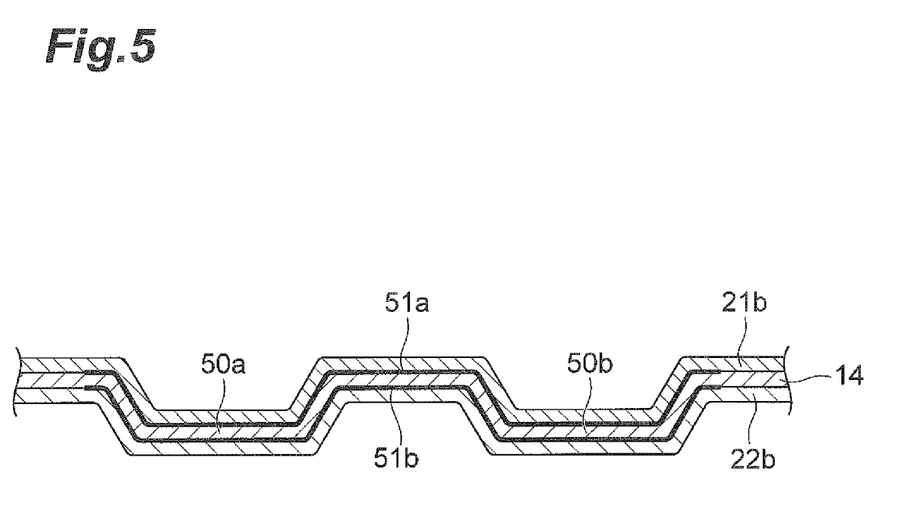
FIG. 5 is a cross-sectional view illustrating region IV taken along line V-V illustrated in FIG. 4.

FIG. 1 is a perspective view illustrating the structure of the floor panel according to the embodiment of the present invention. FIG. 2 is a cross-sectional view illustrating the structure of the floor panel taken along the longitudinal direction (along line II-II illustrated in FIG. 1). FIG. 3 is a cross-sectional view illustrating the structure of the floor panel taken along the lateral direction (along line III-III illustrated in FIG. 1). FIG. 4 is an enlarged perspective view illustrating a front region (region IV illustrated in FIG. 1) at the lateral center of the structure of the floor panel. FIG. 5 is a cross-sectional view illustrating the front region at the lateral center of the structure of the floor panel, taken along the lateral direction (along line V-V illustrated in FIG. 4).

As illustrated in FIG. 1, the structure of the floor panel has a rear floor panel 10 that is provided in the vehicle body and has a storage portion for a spare tire. A storage portion 11 is formed at the center of the rear floor panel 10, and stores the spare tire (not illustrated).

The rear floor panel 10 is concave downwards, thereby forming the storage portion 11. For example, an opening is provided at an upper end of the storage portion 11, and has a rectangular shape when seen from above. A bottom surface is provided at a lower end of the storage portion 11, and has a partially curved shape in conformity with the shape of the spare tire when seen from above. A plurality of dent portions 12 are formed in right and left regions of the bottom surface of the storage portion 11, and extend radially relative to the center of the storage portion 11 in the longitudinal and lateral directions. The bottom surface of the storage portion 11 functions as a mounting surface on which the spare tire is mounted, and a bracket 13 for fixing the spare tire is provided at the center of the bottom surface.

A front edge portion 14 is formed at a front edge of the rear floor panel 10, and is positioned at substantially the same height as the upper end of the storage portion 11. A right edge portion 16 and a left edge portion 15 are respectively formed at right and left edges of the rear floor panel 10, and are positioned at substantially the same height as the upper end of the storage portion 11.

A rear crossmember 20 is installed on a front side of the rear floor panel 10 so as to extend in the lateral direction of the vehicle body, and functions as a first framework member that is joined to the rear floor panel 10. The rear crossmember 20 may be installed on the front side of the rear floor panel 10 via a separate member (not illustrated) that connects the rear crossmember 20 and the rear floor panel 10.

As illustrated in FIG. 2, the rear crossmember 20 has an upper member 21 that is open downwards and a lower member 22 that is open upwards. The upper member 21 has a hat-shaped cross section, and has a front flange 21a and a rear flange 21b. The lower member 22 has an inverse hat-shaped cross section, and has a front flange 22a and a rear flange 22b.

The front flange 21a and the rear flange 21b of the rear crossmember 20 are joined to a top surface of the front edge portion 14 of the rear floor panel 10, and the front flange 22a and the rear flange 22b are joined to a back surface of the front edge portion 14. A dotted line in FIG. 2 illustrates the top surface of the front edge portion 14 and the bottom surface of the storage portion 11. More specifically, FIG. 2 illustrates a state in which the rear flange 21b is joined to a top surface of a right bead 50b (to be described later) formed in the front edge portion 14, and the rear flange 22b is joined to a back surface of the right bead 50b. The front flange 21a and the rear flange 21b face the front flange 22a and the rear flange 22b, respectively, with the front edge portion 14 interposed therebetween. Two closed cross sections 23 are formed between the upper member 21 and the lower member 22, and extend in the lateral direction of the vehicle body. The front edge portion 14 of the rear floor panel 10 extends toward a front side of the vehicle body further than the rear crossmember 20.

Referring to FIG. 1, a rear end panel 30 is installed on a rear side of the rear floor panel 10 so as to extend in the lateral direction of the vehicle body, and functions as a second framework member that is joined to the rear floor panel 10. The rear end panel 30 may be installed on the rear side of the rear floor panel 10 via a separate member (not illustrated) that connects the rear end panel 30 and the rear floor panel 10.

As illustrated in FIG. 2, the rear end panel 30 has a front member 31 and a rear member 32. The front member 31 has an upper flange 31a and a lower flange 31b, and has an inverse L-shaped cross section that is open rearwards and downwards. The rear member 32 has an upper flange 32a and a lower flange 32b, and has a step-shaped cross section. The rear member 32 includes a first wall portion that extends in the vertical direction; an inclined portion that extends forwards and downwards from a lower end of the first wall portion; and a second wall portion that extends downwards from a front end of a base portion.

In the rear end panel 30, the upper flange 31a is joined to the upper flange 32a, and the lower flange 31b is joined to an upper portion of the second wall portion of the rear member 32. The lower flange 32b is joined to a rear end 17 of the rear floor panel 10. A closed cross section 33 is formed between the front member 31 and the rear member 32, and extends in the lateral direction of the vehicle body.

Referring to FIG. 1, rear sidemembers 40R and 40L are respectively installed as framework members on right and left sides of the rear floor panel 10 so as to extend in the lengthwise direction of the vehicle body (the left rear sidemember 40L is not illustrated in FIG. 1). The rear sidemembers 40R and 40L may be respectively installed on the right and left sides of the rear floor panel 10 via respective separate members (not illustrated) that respectively connect the rear sidemembers 40R and 40L and the rear floor panel 10.

As illustrated in FIG. 3, each of the rear sidemembers 40R and 40L has an upper member 41 and a lower member 42. The upper member 41 has an inner flange 41a and an outer flange 41b, and has a hat-shaped cross section. The lower member 42 has an inner flange 42a and an outer flange 42b, and has an inverse hat-shaped cross section.

The inner flange 41a of the right rear sidemember 40R is joined to a top surface of the right edge portion 16 of the rear floor panel 10, and the inner flange 42a of the lower member 42 is joined to a back surface of the right edge portion 16. The inner flange 41a and the inner flange 42a face each other with the right edge portion 16 interposed therebetween. The outer flange 41b is joined to the outer flange 42b. A closed cross section 43 is formed between the upper member 41 and the lower member 42, and extends in the lengthwise direction of the vehicle body. The left rear sidemember 40L and the right rear sidemember 40R are laterally symmetrical with respect to the rear floor panel 10.

As illustrated in FIGS. 1 to 3, a bead portion 50 is formed in the rear floor panel 10 in a longitudinal direction toward the lengthwise direction of the vehicle body as a concave portion. The bead portion 50 includes a pair of a right bead 50b and a left bead 50a which extend in the lengthwise direction of the vehicle body with the bracket 13 interposed therebetween so as to be parallel with each other. However, the bead portion 50 may include only one bead or three or more beads. The bead portion 50 is formed in the vicinity of the center, particularly at the center (refer to center line C1 illustrated in FIG. 1) of the vehicle body in the lateral direction. The pair of right bead 50b and left bead 50a are formed so as to be respectively offset to the right and the left from the center of the vehicle body in the lateral direction.

Each of the pair of right bead 50b and left bead 50a is dented into a belt shape when the rear floor panel 10 is press-molded. Hereinafter, a width w of the bead portion 50 refers to a distance from a left end of the left bead 50a to a right end of the right bead 50b. A depth d of the bead portion 50 refers to a depth of each of the pair of right bead 50b and left bead 50a. The bead portion 50 has a depth greater than that of each of the dent portions 12 that are radially formed in the bottom surface of the storage portion 11.

As illustrated in FIG. 2, the bead portion 50 continues from the front edge portion 14 of the rear floor panel 10 to the storage portion 11. Here, a storage space formed by the storage portion 11 extends between the front edge portion 14 and the rear end panel 30 in the lengthwise direction of the vehicle body, and is concave downwards. The bead portion 50 extends in the bottom surface of the storage portion 11 and the front edge portion 14 in the lengthwise direction of the vehicle body, and extends in the boundary between the storage portion 11 and the front edge portion 14 in the vertical direction of the vehicle body. The bead portion 50 extends toward the vicinity of the rear end of the rear floor panel 10, particularly the rear end 17 (a rear side of the rear portion).

As illustrated in FIGS. 2 and 4, the bead portion 50 extends to an installation region of the rear crossmember 20 so as to face the front side of the vehicle body. The installation region of the rear crossmember 20 refers to a region of the rear floor panel 10, in which the rear crossmember 20, that is, the upper member 21 and the lower member 22 are installed (overlap each other). At this time, at least a front end of the bead portion 50 is interposed between the upper member 21 and the lower member 22 of the rear crossmember 20. A part of the rear crossmember 20 is not illustrated in FIG. 4. As illustrated in FIG. 5, top and back surfaces of the bead portion 50 form surfaces 51a and 51b with convexities and concavities (portions respectively illustrated by bold lines in FIG. 5), respectively.

As illustrated in FIG. 4, the bead portion 50 may extend further than the center (refer to center line C2 illustrated in FIG. 4) of the rear crossmember 20 in the lengthwise direction of the vehicle body. At this time, as described above, the top surface of the bead portion 50 is joined to the rear flange 21b of the upper member 21 of the rear crossmember 20, and the back surface of the bead portion 50 is joined to the rear flange 22b of the lower member 22.

The installation region of the bead portion 50 is not limited, and the bead portion 50 may extend toward the front side of the vehicle body further than the installation region of the rear crossmember 20. At this time, the top surface of the bead portion 50 is joined to the front flange 21a and the rear flange 21b of the upper member 21 of the rear crossmember 20. The back surface of the bead portion 50 is joined to the front flange 22a and the rear flange 22b of the lower member 22.

As illustrated in FIG. 5, it is preferable that a back surface of the upper member 21 and a top surface of the lower member 22 be respectively in contact with the surfaces 51a and 51b with convexities and concavities of the bead portion 50 formed in the front edge portion 14. That is, a back surface of the rear flange 21b of the upper member 21 is preferably in contact with the upper surface 51a with convexities and concavities of the bead portion 50. An upper surface of the rear flange 22b of the lower member 22 is preferably in contact with the lower surface 51b with convexities and concavities of the bead portion 50.

In the structure of the floor panel according to the embodiment described above, the rear floor panel 10 is formed by a single panel. However, as illustrated in FIG. 2, the rear floor panel 10 may be formed by two panels into which the rear floor panel 10 is divided by the closed cross sections 23 of the rear crossmember 20.

Subsequently, the effects of the structure of the floor panel according to the embodiment of the present invention will be described with reference to FIGS. 6 to 11.

As described above, in the structure of the floor panel of the related art, the longitudinally opposite ends and the laterally opposite ends of the rear floor panel are inclined toward the center of the rear floor panel so as to improve the rigidity of the rear floor panel and control the vibration characteristics of the rear floor panel. In the structure of the floor panel, it is necessary to change the size of the rear floor panel depending on the respective inclined angles of the opposite ends of the rear floor panel, and thus there may be some restrictions when designing the vehicle body. For example, it is expected that it is would be difficult to have a common structure for the floor panel for a sedan vehicle and a hatchback vehicle, and a vehicle length or a vehicle width increases in size.

In contrast, in the structure of the floor panel according to the embodiment, the rear floor panel 10 is provided with the bead portion 50 that extends to the installation region of the rear crossmember 20 while having the lengthwise direction of the vehicle body as its longitudinal direction so as to improve the rigidity of the rear floor panel 10 and control the vibration characteristics of the rear floor panel 10. In the structure of the floor panel, it is not necessary to change the size of the rear floor panel 10 depending on the respective inclined angles of opposite ends of the rear floor panel 10, and thus it is possible to improve the rigidity of the rear floor panel 10 and control the vibration characteristics of the rear floor panel 10 while reducing restrictions in the design of the vehicle body.

Figure 6:
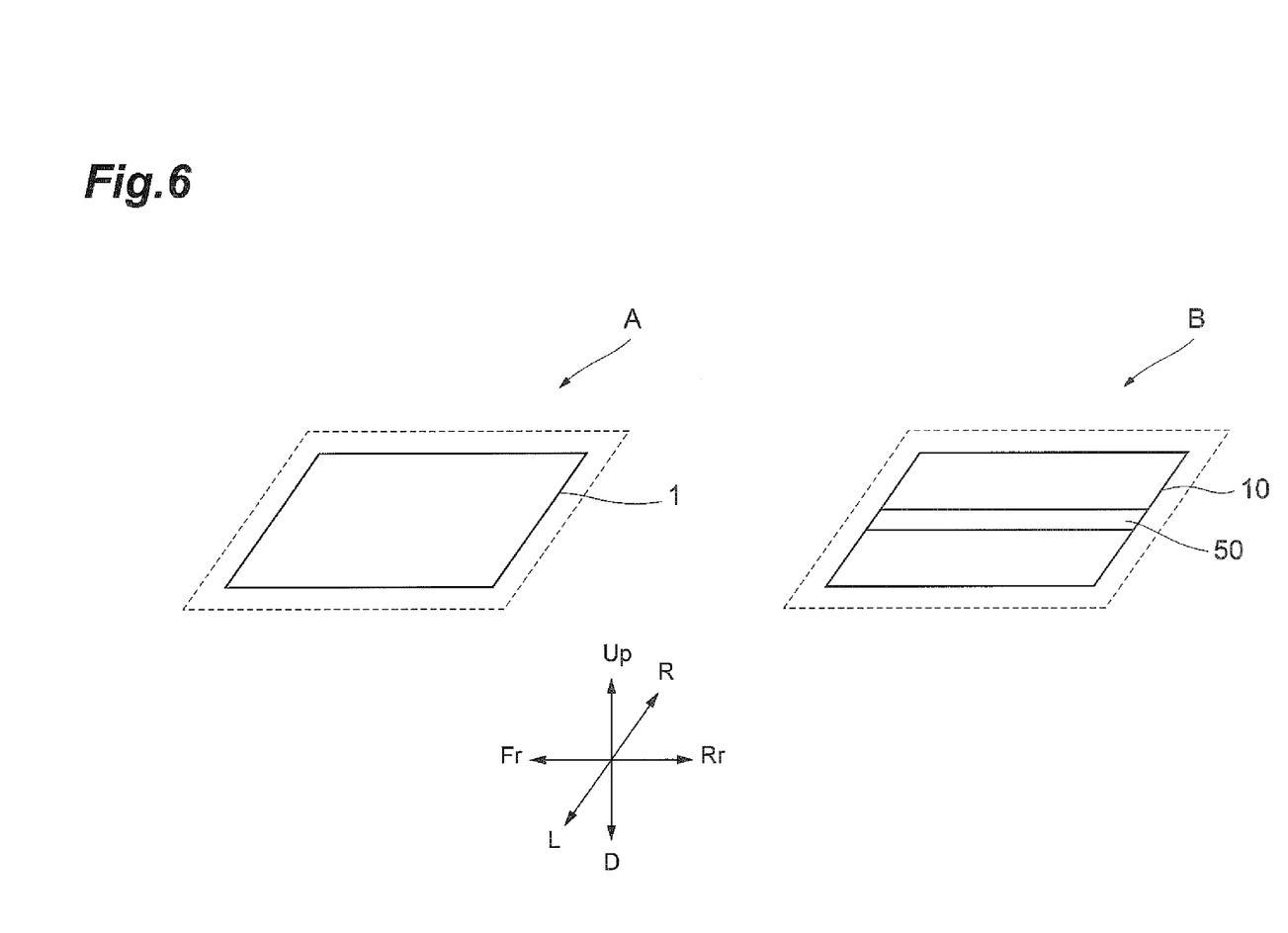
FIG. 6 is a view conceptually illustrating the structure of the floor panel according to the embodiment.
Figure 7:
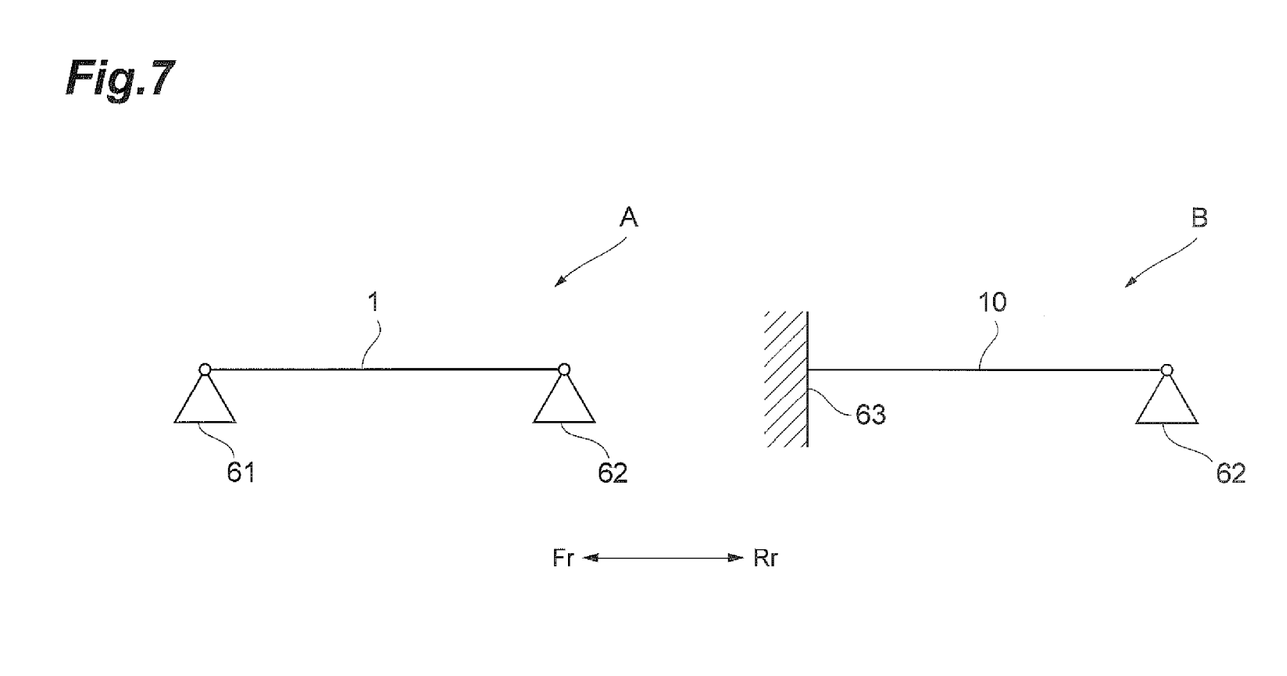
FIG. 7 is a view conceptually illustrating the structure of the floor panel according to the embodiment.
Figure 8:
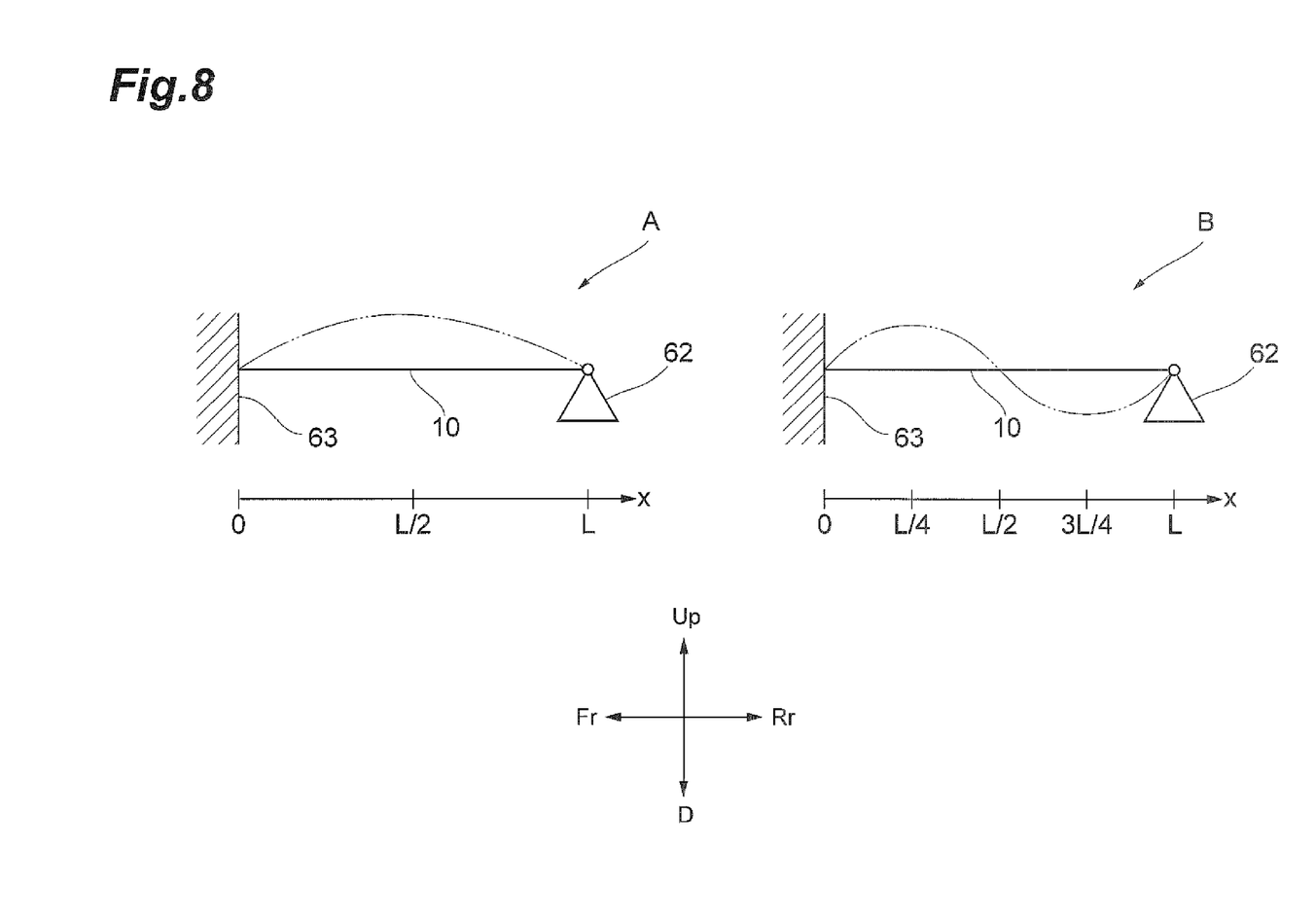
FIG. 8 is a view illustrating a vibration mode of the structure of the floor panel according to the embodiment.

FIGS. 6 and 7 are views conceptually illustrating the structure of the floor panel according to the embodiment, and FIG. 8 is a view illustrating a vibration mode of the structure of the floor panel according to the embodiment.

As illustrated in FIG. 6, since the structure A of a floor panel according to a comparative example is not provided with the bead portion 50 as in the structure B of the floor panel according to the embodiment, the rigidity of the entirety of a rear floor panel 1 is secured due to the surface rigidity of the rear floor panel 1. In contrast, since the structure B of the floor panel according to the embodiment is provided with the bead portion 50 that is formed in the rear floor panel 10 while having the lengthwise direction of the vehicle body as its longitudinal direction, the bead portion 50 with high rigidity functions as a framework portion of the rear floor panel 10. Accordingly, it is possible to improve the rigidity of the entirety of the rear floor panel 10.

As illustrated in FIG. 7, in the structure A of the floor panel according to the comparative example, the rear floor panel 1 is supported with front and rear sides of the rear floor panel 1 proximate to pin support ends 61 and 62, respectively. In contrast, since the structure B of the floor panel according to the embodiment is provided with the bead portion 50 that extends to the installation region of the rear crossmember 20, the rear floor panel 10 is supported with the front side of the rear floor panel 10 proximate to a fixing end 63 (an omnidirectional binding end). Accordingly, it is possible to improve the rigidity of the entirety of the rear floor panel 10 while suppressing an increase in the weight of the structure of the floor panel.

As illustrated in FIG. 8, since the bead portion 50 is formed in the rear floor panel 10 while having the lengthwise direction of the vehicle body as its longitudinal direction, the rear floor panel 10 is deemed to have a beam structure in which the front and rear sides of the rear floor panel 10 are respectively supported by the fixing end 63 and the pin support end 62, and it is possible to control the vibration characteristics of the rear floor panel 10.

Here, the vibration characteristics of the rear floor panel 10 are expressed by overlaying first mode vibration over second mode vibration. In the first mode, the amplitude of a beam having a length L becomes zero when a distance x from the fixing end 63 is zero and L, and becomes the maximum value when the distance x=L/2. In the second mode, the amplitude of the beam becomes zero when the distance x is zero, L/2, and L, and becomes the maximum and minimum values when the distance x=L/4 and 3L/4, respectively.

In the structure of the floor panel that is provided with the bead portion 50, the rigidity of the bead portion 50 dominantly affects the rigidity of the entirety of the rear floor panel 10, and thus it is possible to control the vibration characteristics of the rear floor panel 10, for example, the resonance frequency by adjusting the width w and the depth d of the bead portion 50. In contrast, in the structure A of the floor panel according to the comparative example, the structure of the floor panel is close to a planar structure, and the shape of the surface of the rear floor panel 1 is complicated. Accordingly, it is difficult to control the vibration characteristics of the rear floor panel 1.

Figure 9:
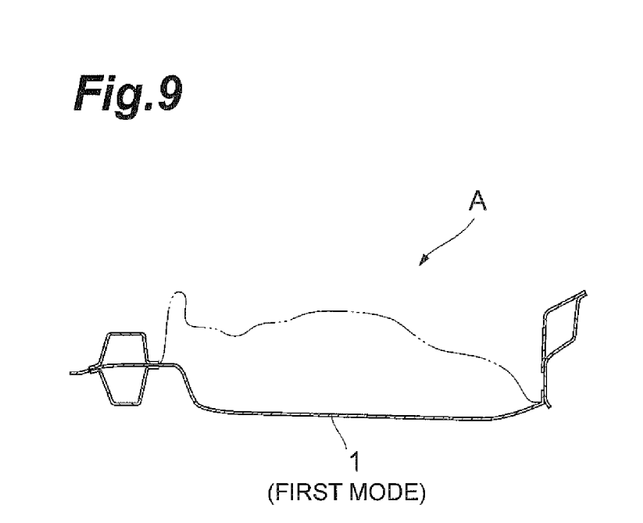
FIG. 9 is a view illustrating deformation suppression effects in the structure of the floor panel according to the embodiment.

FIG. 9 is a view illustrating deformation suppression effects in the structure of the floor panel according to the embodiment. FIG. 9 illustrates states in which the respective cross sections of the floor panels are deformed in the lengthwise direction of the vehicle body at the resonance, in comparison between the structure A of the floor panel according to the comparative example and the structure B of the floor panel according to the embodiment. FIG. 9 exaggeratively illustrates the deformation in the vertical direction of the vehicle body.

As illustrated in FIG. 9, in the structure A of the floor panel according to the comparative example, the rear floor panel 1 is considerably deformed from a front edge portion to a rear end thereof due to the first mode vibration. In contrast, in the structure B of the floor panel according to the embodiment, a first mode vibration-induced deformation of the rear floor panel 10 decreases considerably, and the deformation of the rear floor panel 10 occurs limitedly in the range of the storage portion 11. In the structure B of the floor panel according to the embodiment, a second mode vibration-induced deformation of a front half of the storage portion 11 of the rear floor panel 10 cancels out a second mode vibration-induced deformation of a rear half of the storage portion 11. In other words, the front half is deformed upwards, and the rear half is deformed downwards, thereby suppressing an occurrence of noise associated with the deformations.

Figure 10:
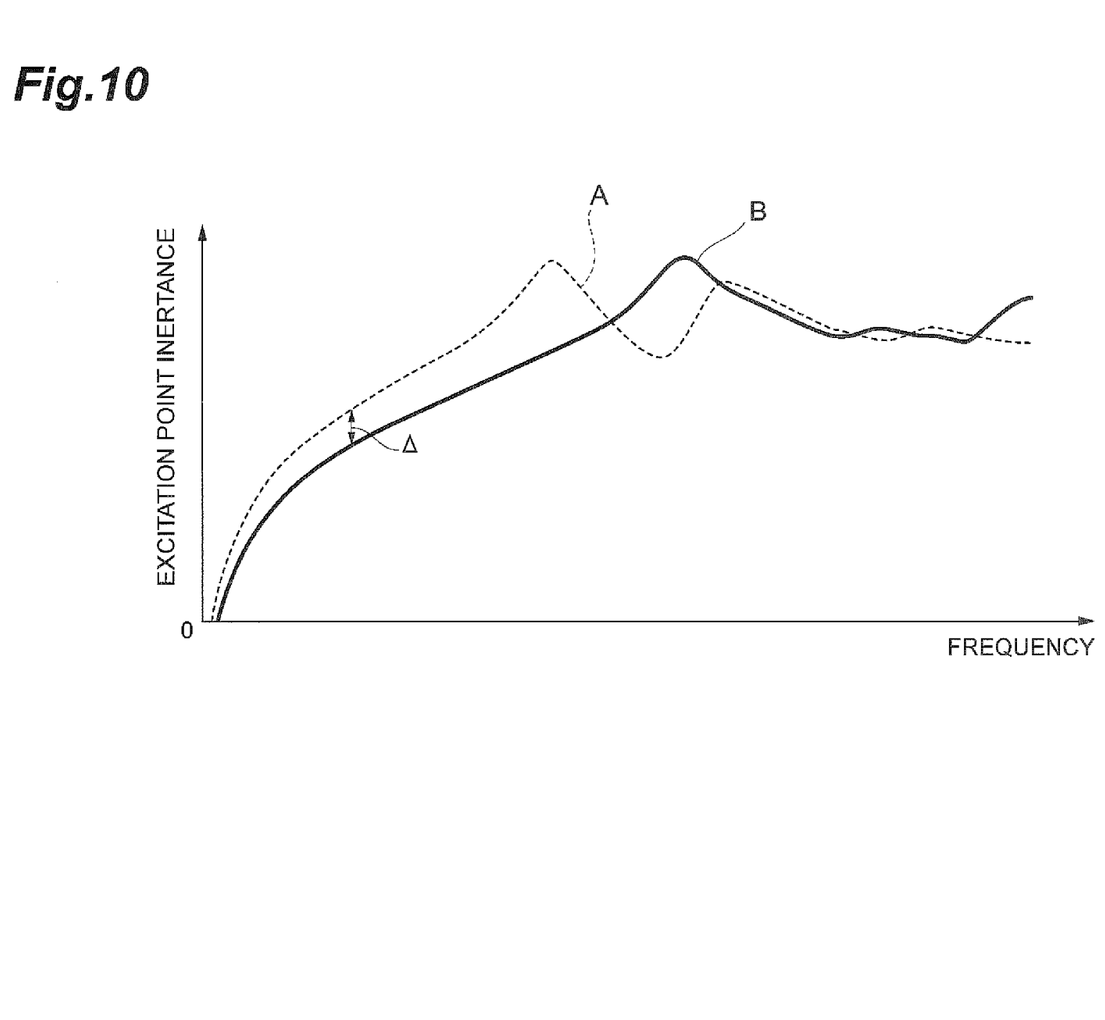
FIG. 10 is a graph illustrating rigidity improvement effects in the structure of the floor panel according to the embodiment.

FIG. 10 is a graph illustrating rigidity improvement effects in the structure of the floor panel according to the embodiment. FIG. 10 illustrates excitation inertance in comparison between the structure A of the floor panel according to the comparative example and the structure B of the floor panel according to the embodiment. Excitation point inertance (dB) indicates an acceleration of a target point when the target point excited. From the results illustrated in FIG. 10, in the structure B of the floor panel according to the embodiment, the excitation point inertance of a spring line (a constant gradient region seen after the excitation point inertance rises) decreases by approximately $\Delta$ 15%. For example, the rigidity improvement (damping) effects are comparable to effects obtained when the rigidity of the spring line is doubled, and are the same effects obtained when a damping material of approximately 2 kg is added to the structure.

Figure 11:
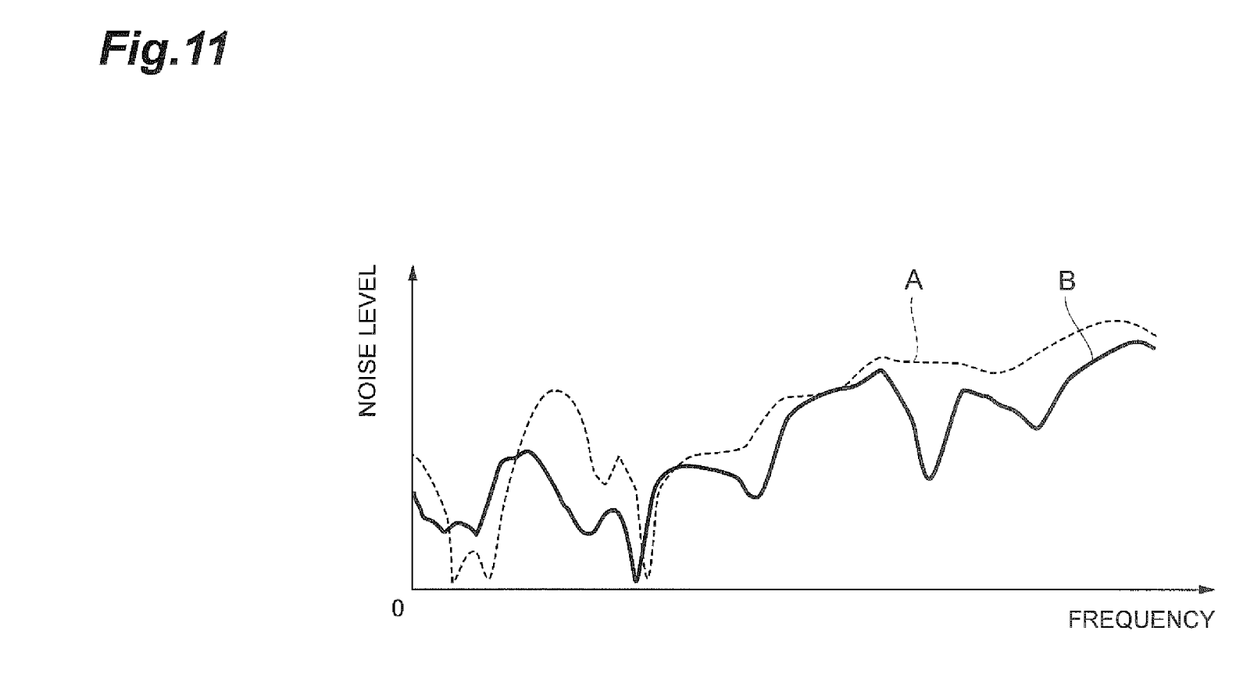
FIG. 11 is a graph illustrating noise reduction effects in the structure of the floor panel according to the embodiment.

FIG. 11 is a graph illustrating noise reduction effects in the structure of the floor panel according to the embodiment. FIG. 11 illustrates the amount of noise occurring in the respective rear floor panels 1 and 10 in comparison between the structure A of the floor panel according to the comparative example and the structure B of the floor panel according to the embodiment. The amount of noise occurring indicates the amount of noise occurring when an attachment point of a suspension considerably affecting road noise is excited. From the results illustrated in FIG. 11, in the structure of the floor panel that is provided with the bead portion 50, a reduced amount of noise occurs at a majority of frequency bands.

As described above, in the structure of the floor panel according to the embodiment of the present invention, the bead portion 50 is formed in the rear floor panel 10 while having the lengthwise direction of the vehicle body as its longitudinal direction, and extends to the installation region of the rear crossmember 20. Accordingly, since it is not necessary to change the size of the rear floor panel 10 depending on the respective angles of the opposite ends of the rear floor panel 10, it is possible to reduce restrictions in the design of the vehicle body. Since the bead portion 50 with high rigidity functions as the framework portion of the rear floor panel 10, and the rear crossmember 20 supports the rear floor panel 10 with the front side of the rear floor panel 10 proximate to the fixing end, it is possible to improve the rigidity of the entirety of the rear floor panel 10. The rear floor panel 10 is deemed to have a beam structure in which one end of the rear floor panel 10 is fixed and the other end is pin-supported, and it is possible to control the vibration characteristics of the rear floor panel 10. Accordingly, in the structure of the floor panel, it is possible to improve the rigidity of the floor panel and control the vibration characteristics of the floor panel while reducing restrictions in the design of the vehicle body.

The rear crossmember 20 may have the upper member 21 that is open downwards and the lower member 22 that is open upwards. The bead portion 50 may be interposed between the upper member 21 and the lower member 22. Accordingly, it is possible to easily form the bead portion 50 that extends to the installation region of the rear crossmember 20.

The bead portion 50 may be formed at the center of the vehicle body in the lateral direction. Accordingly, the bead portion 50 can reliably function as the framework portion of the rear floor panel 10.

The bead portion 50 may extend to the rear end 17 of the rear floor panel 10. Accordingly, the bead portion 50 can reliably function as the framework portion of the rear floor panel 10.

The bead portion 50 may extend further than the center of the rear crossmember 20 in the lengthwise direction of the vehicle body. Accordingly, the rear crossmember 20 can reliably support the rear floor panel 10 with the front side of the rear floor panel 10 proximate to the fixing end.

The bead portion 50 may extend toward the front side of the vehicle body further than the installation region of the rear crossmember 20. Accordingly, the rear crossmember 20 can reliably support the rear floor panel 10 with the front side of the rear floor panel 10 proximate to the fixing end.

The back surface of the upper member 21 and the top surface of the lower member 22 of the rear crossmember 20 may respectively be in contact with the surfaces 51$a$ and 51$b$ with convexities and concavities of the bead portion 50. Accordingly, the rear crossmember 20 can reliably support the rear floor panel 10 with the front side of the rear floor panel 10 proximate to the fixing end.

The above-mentioned embodiment is one embodiment of the structure of the floor panel of the vehicle body according to the present invention. The structure of the floor panel of the vehicle body according to the present invention is not limited to that of the above-mentioned embodiment. The structure of the floor panel of the vehicle body according to the present invention may be modified or applied to other structures insofar as the modification or its application to the other structures does not depart from the scope of the present invention described in the claims.

For example, in the structure of the floor panel according to the embodiment described above, the bead portion 50 formed in the rear floor panel 10 is formed so as to extend to the installation region of the rear crossmember 20. However, in the structure of the floor panel according to the embodiment of the present invention, a bead portion formed in a center crossmember may be formed so as to extend to the installation region of the rear crossmember 20. Here, the center crossmember is joined to the front side of the rear floor panel 10.

In the structure of the floor panel according to the embodiment described above, the bead portion 50 is formed in the rear floor panel 10 so as to extend to the installation region of the rear crossmember 20 while having the lengthwise direction of the vehicle body as its longitudinal direction. However, in the structure of the floor panel according to the embodiment of the present invention, a bead portion may be formed in a front floor panel so as to extend to an installation region of a front crossmember while having the lengthwise direction of the vehicle body as its longitudinal direction.

What is claimed is:

1. A structure of a floor panel of a vehicle body comprising:
    a rear floor panel that is provided in the vehicle body, and has a storage portion for a spare tire;
    a first framework member that is installed on a front side of the rear floor panel so as to extend in a lateral direction of the vehicle body, and is joined to the rear floor panel;
    a second framework member that is installed on a rear side of the rear floor panel so as to extend in the lateral direction of the vehicle body, and is joined to the rear floor panel; and
    a concave portion that is formed in the rear floor panel in a longitudinal direction toward a lengthwise direction of the vehicle body, and extends to an installation region of the first framework member.

2. The structure of the floor panel of the vehicle body according to claim 1,
    wherein the first framework member has an upper member that is open downwards, and a lower member that is open upwards, and
    wherein the concave portion is interposed between the upper member and the lower member.

3. The structure of the floor panel of the vehicle body according to claim 1,
    wherein the concave portion is formed at the center of the vehicle body in the lateral direction.

4. The structure of the floor panel of the vehicle body according to claim 1,
    wherein the concave portion extends to an end portion on a rear side of the rear floor panel.

5. The structure of the floor panel of the vehicle body according to claim 1,
    wherein the concave portion extends further than the center of the first framework member in the lengthwise direction of the vehicle body.

6. The structure of the floor panel of the vehicle body according to claim 5,
    wherein the concave portion extends toward a front side of the vehicle body further than the installation region of the first framework member.

7. The structure of the floor panel of the vehicle body according to claim 2,
    wherein a back surface of the upper member of the first framework member and a top surface of the lower member of the first framework member are respectively in contact with surfaces with convexities and concavities of the concave portion.

* * * * *

UNITED STATES PATENT AND TRADEMARK OFFICE
CERTIFICATE OF CORRECTION

| | |
|---|---|
| PATENT NO. | : 9,227,669 B2 |
| APPLICATION NO. | : 14/484307 |
| DATED | : January 5, 2016 |
| INVENTOR(S) | : Takayoshi Shigihara |

It is certified that error appears in the above-identified patent and that said Letters Patent is hereby corrected as shown below:

In Drawings,

Sheet 9 of 11, delete Fig. 9 and insert Fig. 9 as shown on the attached page.

Signed and Sealed this
Nineteenth Day of April, 2016

Michelle K. Lee
*Director of the United States Patent and Trademark Office*

Fig.9